May 16, 1933.                     E. W. PAGE                     1,909,312
                              X-RAY FILM PACKAGE
                          Original Filed May 10, 1924
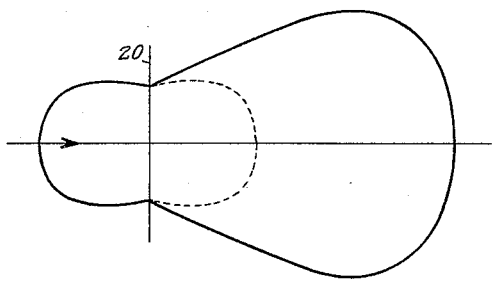
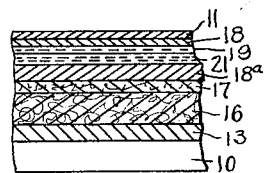
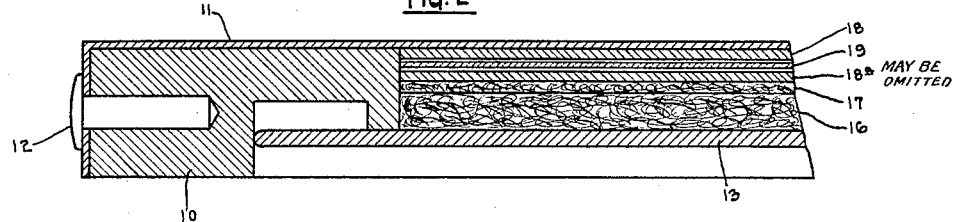
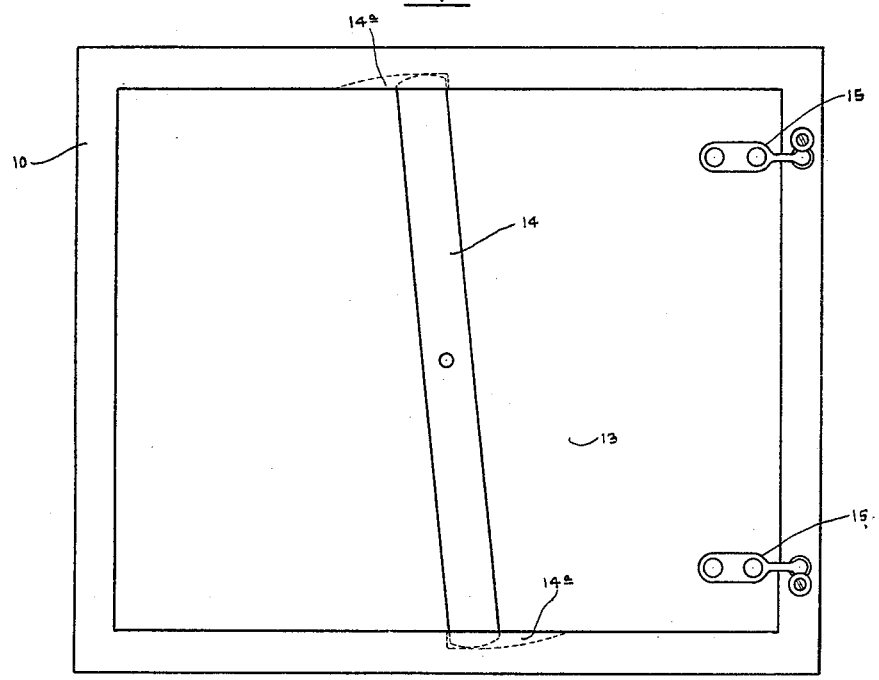
INVENTOR
EVERETT W. PAGE
BY
ATTORNEY Patented May 16, 1933

1,909,312

UNITED STATES PATENT OFFICE

EVERETT W. PAGE, OF OAK PARK, ILLINOIS, ASSIGNOR TO GENERAL ELECTRIC X-RAY CORPORATION, OF CHICAGO, ILLINOIS, A CORPORATION OF NEW YORK

X-RAY FILM PACKAGE

Application filed May 10, 1924, Serial No. 712,341. Renewed December 21, 1927.

The present invention has to do particularly with radiography and its objects are the provision of means for producing a Röntgen ray photograph of finer definition, the elimination from radiographs of the secondary radiation emanating from the substance photographed, and additionally to employ a secondary radiation, purposely created for intensifying the radiographic result.

Incidentally the invention also resides in the provision of a new film or plate pack or package, a novel arrangement of the elements connected therewith, the employment of unique filters for use with an X-ray, and in the disposition of such filters with regard to a sensitized plate or film.

These objects, and the other objects which may hereinafter appear, are attained by the novel construction, combination and arrangement of the several elements constituting an embodiment of the invention, and in the selection of such elements, the arrangement thereof being made clear in the simplest embodiment of my invention which form is illustrated in the accompanying drawing, in which Figure 1 is a plan view of a cassette and cover;

Figure 2 is a fragmentary transverse section therethrough;

Figure 3 is a graphic representation of the distribution of scattered X-rays emanating from an aluminum screen; and Figure 4 is a fragmentary transverse section through a cassette and cover in which a modified form of the invention is employed.

Like reference characters are used to designate similar parts in the drawing and in the description which follows:

In the present development of X-ray photography, it is usual to employ a cassette, one of which is illustrated in Figure 1. In this particular type, a frame 10 (see Figure 2) is employed, and a face 11 for said frame comprising a sheet of aluminum having its edges turned over the ends of the frame 10 and fastened thereto by rivets 12. A cover 13 for said cassette, adapted to be inserted into said frame 10, is detachably secured thereto by a spring clip 14, the ends of which engage in grooves 14a in frame 10. For convenience, the cover 13 is generally hinged to frame 10, one type of hinge being shown at 15. The invention, however, is equally applicable to dental film packs and other packages for X-ray films.

It is customary and usual at the present time to apply to the cover 13, a felt backing 16 and to dispose upon said felt, a cardboard backer 17 for the film as is indicated in Figure 2. Between the aluminum face 11 of the cassette and the cardboard backer 17, a photographic plate or film is disposed. As the usual practice now is to use films, hereafter the light sensitive element will be designated as a film, and the sensitized surface thereof is invariably placed adjacent to or abutting the aluminum face 11. In such an arrangement, it is impossible to produce a radiograph free from the clouding or fogging effects of secondary radiation, and this defect is particularly noticeable when metallic substances are photographed. Such substances, of course, are always placed intermediate the cassette and X-ray tube, and invariably are laid upon aluminum face 11, the X-ray tube being suspended perpendicularly thereabove.

As indicated above, in all branches of radiography, the fogging or clouding of the negative is noted, but most particularly in radiographs of thick metallic substances wherein long exposures are necessary.

Whenever X-rays strike a substance, three classes of radiation result in general, and these are called scattered X-rays, characteristic X-rays, and corpuscular rays. Of these, the first two are X-rays, and the last negatively charged electrons. The proportions of the three classes vary with the substance, and additionally depend upon the character of the primary rays. As it is impossible to prevent such secondary radiation in a substance exposed to a beam of X-ray, it is desirable to prevent, if possible, the secondary radiation from the substance being X-rayed from striking the photographic material or film. In this discussion, by secondary radiation, all radiations set up in the material, other than the unaltered radiation, are meant. A filter for the purpose of absorbing such secondary radiations has been chosen, such a filter necessarily being adapted to admit of the passage of unaltered emanations from the X-ray tube for the purpose of producing photochemical changes upon the sensitized film.

The simplest form of the invention is readily understood from an examination of Figure 2. Immediately adjacent the inside surface of face 11, a filter 18 is placed. Such filter usually comprises a thin sheet of lead or silver or other heavy material, the effect thereof being to absorb the secondary radiation produced by the object radiographed and the aluminum face 11, while allowing primary radiation from the tube to pass therethrough. Against this, sensitized surface uppermost, if only one surface is sensitized, is disposed a film 19. The cover 13 is then fastened in position with the cardboard backer 17 abutting the film 19. The position of filter 18 was decided upon after experimenting with it placed both upon the outer and inner surface of face 11, the former position leading to the discovery that the aluminum facing 11 does not absorb the secondary radiation from the object radiographed.

A second form of the invention illustrated by Figure 2 comprises the arrangement just described, with the addition thereto of a sheet 18a of silver or lead thicker or heavier than filter 18 and immediately beneath the film 19, such sheet hereafter being designated as a metal or lead back.

With either form of the invention, intensifying screens 21, expedients common in the X-ray art, may be employed. The metal sheets, when intensifying screens are used, are placed upon the backs of such screens, or the metals sheets may be made to serve as backs for the intensifying medium itself.

The experiments conducted disclosed that for varying problems of radiography, filters of different materials produced different results, and also that each individual problem required a filter and a metal back of different thicknesses for maximum definition in negatives.

The conclusions which are drawn from these experiments are that the filter 18 absorbs the secondary radiation from the substance X-rayed and from the face 11 of the cassettes, and in turn, produces a secondary radiation in itself, which secondary radiation, because of the surface contact of the film 19 and the radiator 18, intensifies the photographic result. As experiments employing the metal back upon the film 19 showed even better definition, it was immediately apparent that the surface contact between the two metal surfaces and the film 19 was beneficial, because the secondary radiation set up in said filter 18 and the metal back is utilized to intensify the radiograph.

In this invention, the well established phenomenon that scattered X-rays are not uniformly distributed is availed, Figure 3 graphically indicating, as has been experimentally proved by passing a beam of X-ray through a screen of aluminum 20, that the greater portions of scattered X-rays are to be found in the backward and forward directions of the original beam indicated by the arrow in said figure than at right angles thereto. Incidentally, while lead and silver may themselves produce a large volume of scattered radiation, but little of such radiation escapes except in the direction, forward or backward, of the X-ray itself.

I claim:

1. The combination in a film package of a film, an enclosing member, an intensifier comprising a sheet of metal having a specific gravity greater than that of the material of the enclosing member and in surface contact with and in front of said film, and a second sheet of metal of higher specific gravity than said enclosing member and in back of said film, said second sheet of material being of greater thickness than said first mentioned sheet.

2. A film pack for X-ray photographs comprising a sensitized member, a covering of metal of low specific gravity therearound, and a plurality of sheets of a metal having a specific gravity higher than that of the cover disposed in surface contact with said sensitized member on opposite sides of said member, said sheets of metal being designed to absorb the secondary rays resulting from said covering, the object photographed, and surrounding members.

3. The combination in a film package of a film, an enclosing member, an intensifier comprising a sheet of material having a specific gravity greater than that of the material of the enclosing member and in surface contact with and in front of said film, and a second sheet of material of higher specific gravity than said enclosing member and in back of said film, said second sheet of material being of greater thickness than said first mentioned sheet.

4. A film pack for X-ray photographs comprising a sensitized member, a covering of material of low specific gravity therearound, and a plurality of sheets of a material having a specific gravity higher than that of the cover disposed in surface contact with said sensitized member on opposite sides of said member, said sheets of material being designed to absorb the secondary rays resulting from said covering, the object photographed, and surrounding members.

5. A film pack for X-ray photographs comprising a sensitized member, a covering member of low specific gravity therearound, and a plurality of sheets of a metal having a specific gravity higher than that of said cover disposed in surface contact with said sensitized member on opposite sides of said member, said sheets of metal being designed to absorb the secondary rays resulting from said covering, the object photographed and surrounding members, the sheet of metal intermediate the sensitized member and the cover in the direction of the primary source of radiation possessing a predetermined coefficient in respect to intensifying the primary radiation and preventing fogging due to secondary radiation resulting from the covering and the article radiographed and the other of said sheets to the back of said sensitized member being of sufficient thickness to prevent fogging due to secondary radiation originating behind it.

EVERETT W. PAGE.